(12) United States Patent
Schreiber (10) Patent No.: US 9,908,173 B2
(45) Date of Patent: Mar. 6, 2018

(54) METHOD FOR PRODUCING A COMPONENT, COMPONENT AND TURBOMACHINE HAVING A COMPONENT

(75) Inventor: Karl Schreiber, Am Mellensee (DE)

(73) Assignee: ROLLS-ROYCE DEUTSCHLAND & CO KG, Blankenfelde-Mahlow (DE)

( * ) Notice: Subject to any disclaimer, the term of this patent is extended or adjusted under 35 U.S.C. 154(b) by 1053 days.

(21) Appl. No.: 14/009,301

(22) PCT Filed: Apr. 2, 2012

(86) PCT No.: PCT/EP2012/055987
§ 371 (c)(1),
(2), (4) Date: Jan. 20, 2014

(87) PCT Pub. No.: WO2012/131100
PCT Pub. Date: Oct. 4, 2012

(65) Prior Publication Data
US 2014/0127005 A1    May 8, 2014

(30) Foreign Application Priority Data
Apr. 1, 2011   (DE) .......................... 10 2011 006 659

(51) Int. Cl.
*B22C 7/02*         (2006.01)
*B22C 9/04*         (2006.01)
(Continued)

(52) U.S. Cl.
CPC .................. *B22C 9/22* (2013.01); *B22C 7/02* (2013.01); *B22C 9/04* (2013.01); *C23C 4/02* (2013.01);
(Continued)

(58) Field of Classification Search
CPC ................ B22C 7/02; B22C 9/04; B22C 9/22
(Continued)

(56) References Cited

U.S. PATENT DOCUMENTS 3,996,991 A * 12/1976 Ugata et al. .............. B22C 7/02
                                               164/131
5,630,314 A *  5/1997 Kojima et al. ............ C23C 4/02
                                               416/241 B
(Continued)

FOREIGN PATENT DOCUMENTS

DE            19543510        5/1997
DE         101 17 127 A1     10/2002
(Continued)

OTHER PUBLICATIONS

Wikipedia definition of "Investment Casting", http://en.wikipedia.org/wiki/Investment_casting, Wikimedia Foundation, Inc., Mar. 7, 2011.
(Continued)

*Primary Examiner* — Kevin P Kerns
(74) *Attorney, Agent, or Firm* — SHUTTLEWORTH & INGERSOLL, PLC; Timothy J. Kilma (57) ABSTRACT

A method for manufacturing a metallic component especially configured and designed for a turbomachine includes a) for a precision-casting process, a wax model with a wax structure is produced, subsequently b) the tip of the wax structure is thermally and/or mechanically treated such that a region with an undercut is formed on the wax structure, subsequently c) the metallic component is manufactured from the wax model in the precision-casting process, with a component structural element with an undercut forming on a surface of the component, and d) the component structural element is provided at least partially with a ceramic coating, a plastic-containing coating, in particular a fiber composite layer and/or a plastic component.

8 Claims, 5 Drawing Sheets

(51) Int. Cl.
  *B22C 9/22* (2006.01)
  *C23C 4/02* (2006.01)
  *F01D 5/28* (2006.01)
  *F01D 11/12* (2006.01)

(52) U.S. Cl.
  CPC ............... *F01D 5/28* (2013.01); *F01D 5/288* (2013.01); *F01D 11/12* (2013.01); *F01D 11/125* (2013.01); *F05D 2230/211* (2013.01); *Y02T 50/672* (2013.01)

(58) Field of Classification Search
  USPC ....................................................... 164/6, 34
  See application file for complete search history.

(56) References Cited

U.S. PATENT DOCUMENTS

| | | | |
|---|---|---|---|
| 5,868,194 A * | 2/1999 | Horwood | .................. B22C 9/04 164/122.2 |
| 6,074,706 A | 6/2000 | Beverly et al. | |
| 7,156,622 B2 | 1/2007 | Schreiber | |
| 8,209,831 B2 | 7/2012 | Boehm et al. | |
| 2002/0146541 A1 | 10/2002 | Fried | |
| 2007/0034350 A1* | 2/2007 | Renkel et al. | ............ B22C 1/04 164/519 |
| 2009/0126603 A1 | 5/2009 | Diem et al. | |

FOREIGN PATENT DOCUMENTS

| | | |
|---|---|---|
| DE | 10124398 | 11/2002 |
| DE | 10307610 | 9/2004 |
| DE | 10 2005 050 873 | 4/2007 |
| DE | 102007054614 | 5/2009 |
| EP | 1247874 | 10/2002 |
| EP | 1450006 | 8/2004 |
| WO | 2007/087989 | 8/2007 |

OTHER PUBLICATIONS

International Search Report dated May 30, 2012 from counterpart PCT App No. PCT/EP2012/055987.
English translation of International Search Report a dated May 30, 2012 from counterpart PCT App No. PCT/EP2012/055987.
German Search Report dated Dec. 22, 2011 from counterpart German App No. 10 2011 006 659.4.

* cited by examiner

METHOD FOR PRODUCING A COMPONENT, COMPONENT AND TURBOMACHINE HAVING A COMPONENT

CROSS-REFERENCE TO A RELATED APPLICATION

This application is the National Phase of International Application PCT/IB2012/055987 filed Apr. 2, 2012 which designated the U.S.

This application claims priority to German Patent Application No. DE102011006659.4 filed Apr. 1, 2011, which application is incorporated by reference herein.

BACKGROUND

This invention relates to a method for manufacturing a component, a component producible with said method and a turbomachine having a component.

In turbomachines in particular, it is necessary either to use components which are particularly thermally or mechanically stable themselves, or to use components which protect other parts of the machine from thermal, mechanical and physical loads. In an aircraft engine, temperatures of 2000 K or higher can be reached. It is known here, among others, to provide metallic components with a ceramic coating. The ceramic coating is here used above all as a thermal insulation layer. It is also known to provide metallic components with plastic-containing coatings, in particular fibre composite layers, as the latter have, for example, weight advantages.

The coating (ceramic or plastic-containing) and the metallic component have differing thermal and mechanical properties, so that there is a risk of the ceramic coating detaching from the metallic component under thermal, mechanical and/or physical load.

A method for manufacturing ceramic-coated metallic components is known in principle from DE 10 2005 050 873 A1. The use of fibre composite layers is known from EP 1 450 006 B1.

SUMMARY

There is therefore a need to find efficient methods by which such components can be manufactured in composite design.

This is made possible by a method in accordance with the present disclosure for manufacturing a metallic component, especially configured and designed for a turbomachine.

Here initially a wax model with a wax structure for a precision-casting process is created.

Subsequently the tip of the wax structure is thermally and/or mechanically processed, such that an area with an undercut is formed on the wax structure. During thermal treatment of the tip in particular, the area of the tip is melted, so that an undercut forms due to the surface tension of the wax.

Subsequently the metallic component is manufactured from the wax model in the precision-casting process, where a component structural element with undercut is created on the surface of the component.

Finally a component structural element is provided at least partially with a ceramic coating, a plastic-containing coating, in particular a fibre composite layer, and/or a plastic component.

Due to the undercuts of the component structural elements, a secure and positive grip of the coating (ceramic and/or plastic-containing) and/or of the plastic component is made possible, where the undercuts can be manufactured particularly efficiently by the thermal and/or mechanical treatment.

In an advantageous design variant, the mechanical stresses inside the ceramic coating are reduced in that after the application of the ceramic coating controlled segmentation cracking originating from the component structural element occurs in the ceramic coating. The tips of the component structural elements act here as the starting point for targeted segmentation cracking.

Advantageously, a material permeable for a hardenable plastic is first applied to the metallic component for application of the plastic-containing coating, of the fibre composite layer and/or of the plastic component, where the hardenable plastic is then poured through the permeable material. It is particularly advantageous when the permeable material has a non-woven fabric, a fibre mat, a textile material, a composite fibre mat and/or a carbon fibre mat. In this way, lightweight and flexible plastic-containing coatings and/or plastic components can be applied to the metallic part.

In advantageous exemplary embodiments of the method, the thermal treatment of the tip of the wax structure is performed by means of a laser, an R radiation source, a flame and/or a contact heater. A laser device can thermally shape certain wax structures in a targeted manner, while an IR radiation source or a flame can thermally shape larger areas efficiently. When the wax structures are brought into contact with a hot plate, contact heating can take place, where additionally a compressive force can also be applied to the wax structures.

The thermal treatment of the wax structure of the wax model an here be uniform or locally varying. In the latter case, the wax structure—and in the final analysis the component structural element too—can be selectively adapted to the thermal and/or mechanical requirements in the turbomachine.

In advantageous embodiments, the wax structure has substantially rod-shaped structures, linear structures, lattice structures and/or honeycomb structures. These wax structures can also be used in combination in a wax model.

Particularly advantageous are embodiments where, after thermal treatment of the tip of the wax structure, the tip forms with a rounded or mushroom shape, with the undercut being arranged underneath the rounded or mushroom-shaped tip.

For a good connection between the metallic part of the component and the coating (ceramic and/or plastic-containing) and/or of the plastic component, it is advantageous for the component structural elements to have a mean height of between 0.2 and 2 mm. It is also advantageous when there is a mean distance of between 0.2 and 4 mm between two component structural elements.

Prior to the application of the coating (ceramic and/or plastic-containing) and/or of the plastic component, it can be advantageous when an intermediate layer, in particular an adhesion-promoting layer, an anti-corrosion layer and/or an anti-oxidation layer is applied. The intermediate layer can in particular consist of MCrAlY.

With the method described, a component having the above advantages can be manufactured. A particularly advantageous use is in a turbomachine, especially a steam or gas turbine, or in an aircraft engine. The component can be used here as a liner inside or on a wall, as a turbine blade, as a compressor blade and/or as a thermal insulation element.

BRIEF DESCRIPTION OF THE DRAWINGS

In the following figures, various embodiments are described by way of examples.

DETAILED DESCRIPTION

Figure 1:
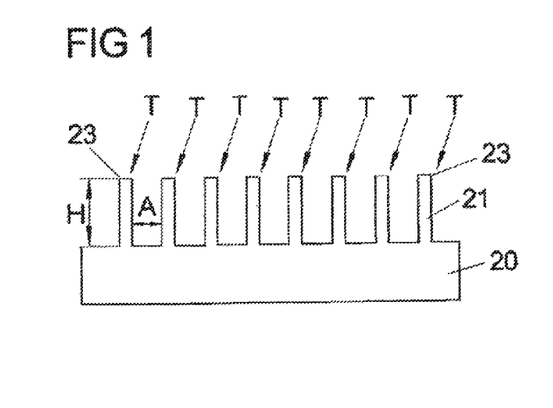
FIG. 1 shows a side view of an embodiment of a wax model for a component.

FIG. 1 shows a schematic side view of a wax model 20. The term wax model refers here to a casting model in the precision-casting process. Other materials can also be used for the casting model. Wax structures 21 are arranged on the upper side of the wax model 20. The wax structures 21 finally become, after a precision-casting step, component structural elements 11 (see for example FIG. 3) on a component 10.

In the embodiment described here, the wax structures 21 are arranged substantially linear and parallel to one another. The distance A between the component structural elements 11 can be 0.2 to 4 mm. The height H of the component structural elements 11 can be 0.2 to 2 mm.

Figure 1A:
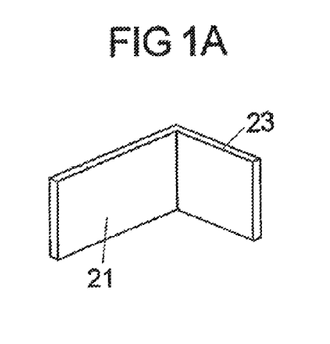
FIGS. 1A, B show detail views of wax structures of the wax model in accordance with FIG. 1.
Figure 1B:
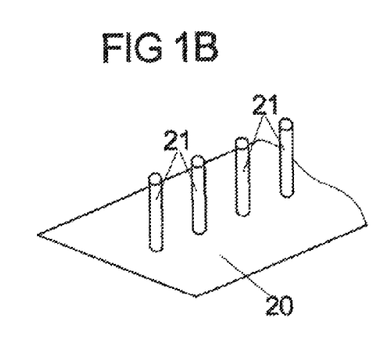

Generally speaking, however, other shapes for the wax structures 21 are also possible, as shown in FIG. 1A, which shows a part of a wax structure 21 with an angular structure. FIG. 1B shows rod-shaped wax structures 21 with a round cross-section.

The wax model 20 is intended for use in a precision-casting method. The wax models 20 are here typically formed out of special waxes, thermoplastics or mixtures thereof and are made for example by injection moulding.

The wax models 20 have a comparatively low melting point, allowing them to be melted out of a casting mould, not shown here, during the precision-casting process. This casting method with lost mould permits the manufacture of very fine component structural elements 11 at very low tolerances. The surface quality too of the components 10 manufactured by this method is very good, so that as a rule no further reworking is required.

Components 10 can therefore be manufactured that have fine component structural elements 11, for example closely adjacent linear component structures 11 and/or rod-shaped component structural elements 11.

To achieve good adhesion of the ceramic coating 2 to be applied later on (see FIG. 4), of a plastic-containing coating 6, 7 (see FIG. 7) and/or of a plastic component, in a next process step the tips 23 of the wax structures 21 are plastically shaped by a thermal and/or mechanical treatment T (symbolized by arrows in FIG. 1) using a contact plate 5. The result of this is a widened tip 23, which can for example be designed rounded or mushroom-shaped. Underneath the widened tip 23 is an undercut 22, which—as described in the following—is important for the connection to the coating 2 (ceramic and/or plastic-containing) (see FIGS. 4, 7) and/or the plastic component. The contact plate 5 can here not only be designed flat, but also have contours adapted to the wax model 20. The shaping of the tips 23 can be assisted by selective application of a compressive force.

If for example the tip 23 of the wax structure 21 is subjected to laser radiation, to a flame and/or to a heated contact plate 5 (see FIGS. 8A, B), the plastic of the wax model 20 melts at the tip 23. If this thermal treatment is not too long, only the tip 23 melts, with the melted portion assuming a spherical shape due to surface effects. After the end of the thermal treatment, the plastic solidifies at the tip 23 to a kind of bead or mushroom shape which is wider or has a larger diameter than the unmelted wax structure 21 underneath the shaped area. In this way, an undercut 22 forms on the wax structures 21 underneath the melted area.

Figure 2:
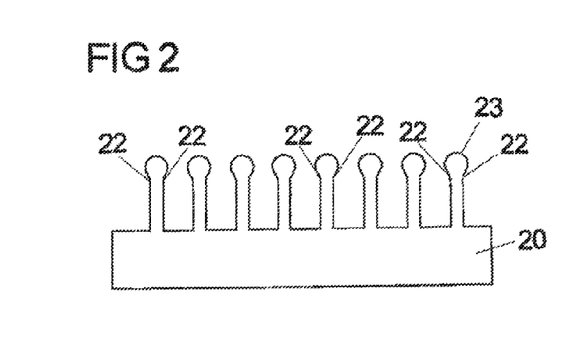
FIG. 2 shows a side view of a wax model in accordance with FIG. 1 with a wax structure after thermal shaping, FIGS. 2A, B show detail views of wax structures of the wax model in accordance with FIG. 2.
Figure 2A:
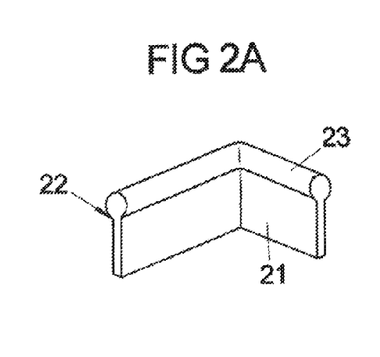
Figure 2B:
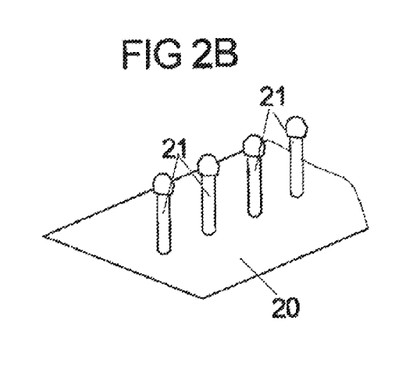

FIG. 2A shows in detail the angular wax structure 21 from FIG. 1A, and FIG. 2B the rod-shaped wax structures 21 from FIG. 1B, in each case with undercuts 22 following the thermal/mechanical shaping T. The spherical or mushroom shapes of the tips 23 can be discerned here.

FIG. 2 thus describes a wax model 20 used in a precision-casting method known per se. The lost wax model 20 in particular is typical for precision-casting methods, i.e. after manufacture of a casting mould the wax model 20 is lost by being melted out of the casting mould.

Figure 3:
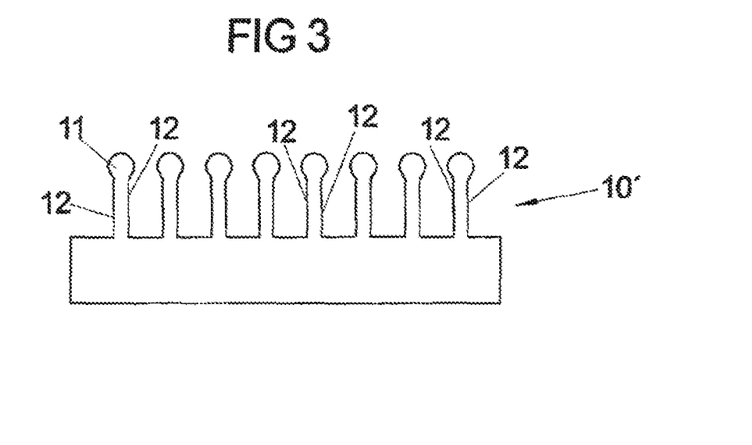
FIG. 3 shows a side view of an embodiment of a component manufactured in the precision-casting process.

A metallic material is then poured into the casting mould, not shown here, at the end of which process the provisional component 10 shown schematically in FIG. 3 is obtained. Three-dimensional component structural elements 11 were created on the provisional component 10' by the precision-casting method. The component structural elements 11 have at their respective tips rounded or thickened areas, so that undercuts 12 are created underneath them.

If a ceramic coating 2 is now applied (see FIG. 4) to this provisional component 10, the component 10 is obtained, which is suitable and designed to be subjected to particular thermal stresses in a turbomachine. The ceramic coating 2 is in particular fixed by the positive connection resulting from the undercuts 12. The ceramic coating 2 can be applied here for example by plasma spraying, in particular atmospheric plasma spraying.

To obtain a positive effect on the service life of the components 10, it is useful to generate segmentation cracks 3 in the ceramic coating 2 in targeted manner. The segmentation cracks 3 prevent major mechanical stresses building up in the ceramic coating 2. As a result, the ceramic coating 2 is split into a plurality of single ceramic parts which however are all held securely on the component 10.

Figure 5:
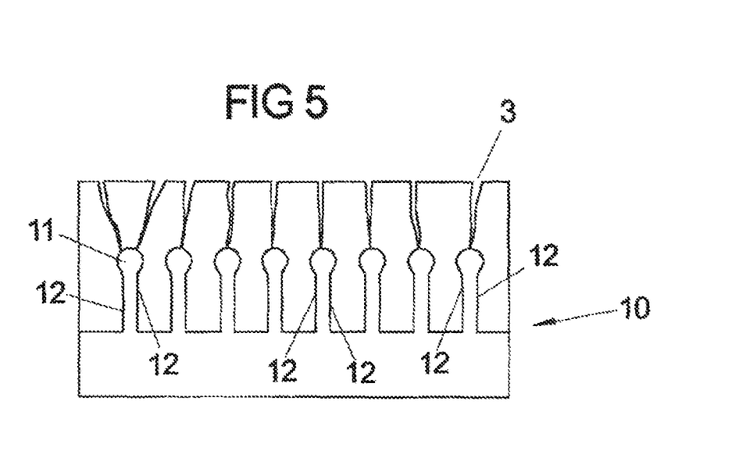
FIG. 5 shows a side view of a component in accordance with FIG. 4 with segmentation cracking.

As shown schematically in FIG. 5, the segmentation cracks 3 originate from the tips of the component structural elements 11 and extend to the upper side of the component 10.

The segmentation cracks contribute together with the embodiment of the component 10 in a targeted manner to the overall stabilization of the ceramic coating 2. Segmentation cracks 3 typically arise when the ceramic compound deposited when very hot cools down or during later operating states marked by high thermal gradients or transients. The tensile stresses occurring here lead to the segmentation cracks 3.

If the component structural elements 11 are arranged with a certain regularity on the component 10, the segmentation cracks 3 too—and hence the ceramic elements of the ceramic coating 2—form with a certain regularity in their shape and size. Crack densities between 5 and 30 cracks per mm can be typically attained.

Figure 4:
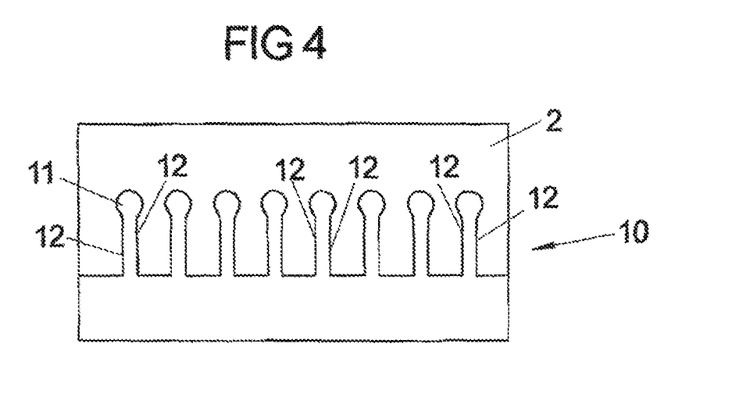
FIG. 4 shows a side view of a component in accordance with FIG. 3 having a ceramic coating.
Figure 6:
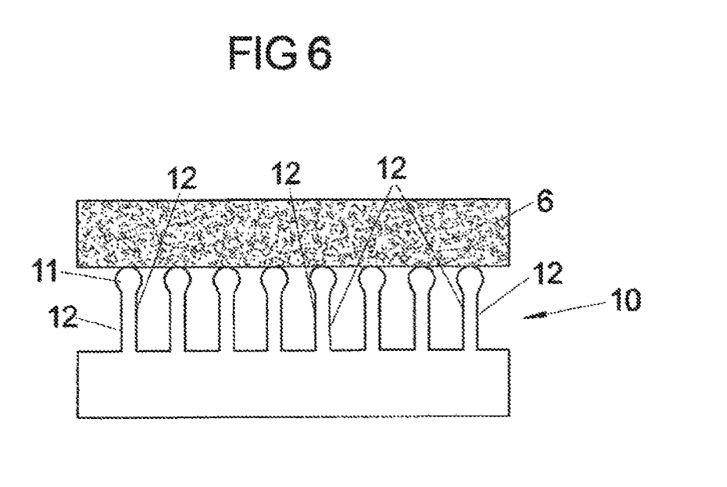
FIG. 6 shows a side view of an embodiment of a component having a plastic-containing coating at a first point in time.
Figure 7:
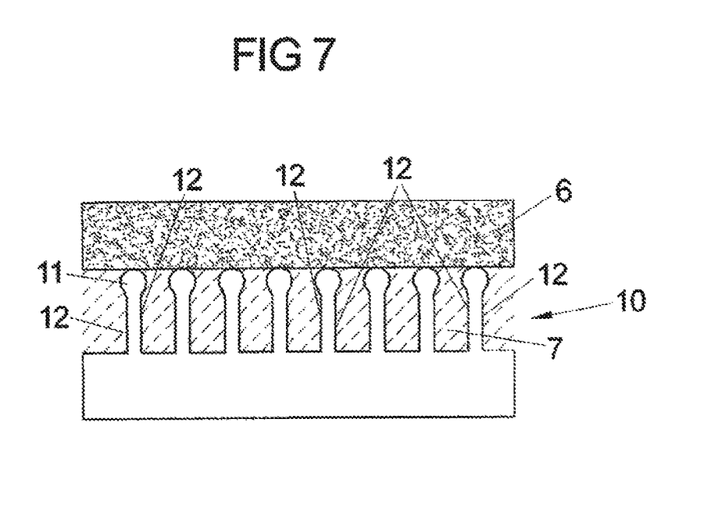
FIG. 7 shows a side view of the embodiment of the component in accordance with FIG. 6 at a later point in time, FIGS. 8A, B show detail views of embodiments of wax structures prior to a thermal/mechanical treatment, FIGS. 9A, B show detail views of embodiments of wax structures after a thermal/mechanical treatment.

FIGS. 6 and 7 show, by analogy with the FIGS. 3 and 4, the application of a plastic-containing coating 6, 7. A coating of this type can be provided alternatively to a ceramic coating 2 or additionally, for example elsewhere on the component 10. For its manufacture, a material 6 is placed (see FIG. 6) onto the component 10, in this case the tips of the component structural element 11, this material being permeable for a hardenable plastic, for example synthetic resin RTM 6. Examples for these permeable materials are non-woven fabrics, a fibre mat, textile materials, a composite fibre mat and/or a carbon fibre mat. The fibres can for example also consist of glass, ceramic, aramide or metals. The dry fibres can here also be at least partially compressed between the component structural elements 11. FIG. 6 must in this respect only be understood schematically.

Then a hardenable plastic 7 is poured through the permeable material 6, said permeable material 6 remaining as a matrix saturated by the plastic and the plastic hardening behind the undercuts 12. The result is a fibre composite layer 6, 7 securely connected by the undercuts 12 to the component 10.

FIGS. 6 and 7 describe how a plastic-containing coating is made, i.e. how the application of a plastic-containing material layer is performed. This material layer 6 does not necessarily have to take the form of a mat or a similar flat material. Generally speaking, the plastic part 6 can also be a separate plastic component having a complex shape and possibly already adapted to the shape of the component 10.

Figure 8A:
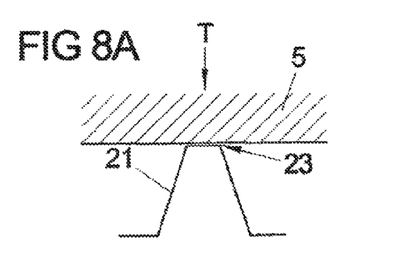
Figure 8B:
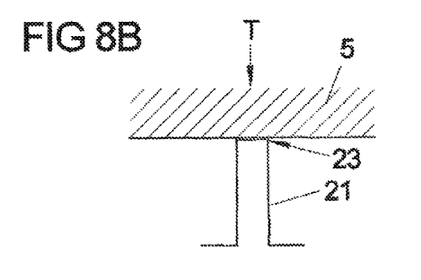

FIGS. 8A and 8B show in cross-section two wax structures 21 which after the described implementation of the precision-casting process lead to component structural elements 11 of the same shape. The tip 23 of the wax structures 21 is shown in FIGS. 8A and 8B still unshaped. The wax structure 21 according to FIG. 8A has a narrow tip 23 and a wider base. The wax structure 21 according to FIG. 8B has an even width, with the wax structure 21 being designed relatively slender. Generally speaking, the wax structures 21 can be for example linear structures or also rod-shaped ones. In this case, the wax structure 21 according to FIG. 8A would stand for a frustum-shaped structure and the wax structure 21 according to FIG. 8B for a rod-shaped structure.

FIGS. 8A and 8B indicate schematically that a thermal shaping T, e.g. by a hot contact plate, can be performed. The hot contact plate is here pressed onto the tip 23 of the wax structure 21, so that the tip 23 is shaped under the effect of heat and mechanical pressure.

Figure 9A:
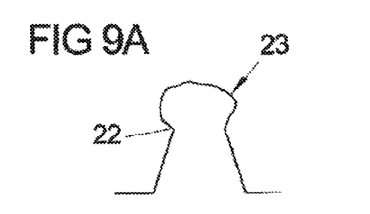
Figure 9B:
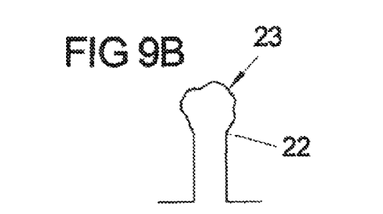

The result of the thermal treatment is shown in FIGS. 9A and 9B, where FIG. 9A is associated with FIG. 8A and FIG. 9B with FIG. 8B. The creation of the undercut 22 underneath the shaped tip 23 can be discerned.

In the examples shown so far, all wax structures 21 (and hence also the component structural elements 11 of a component 10) are substantially shaped in the same way. This must not necessarily be the case. In advantageous embodiments, the shaping of the tip 23 can differ in the various areas of the wax model 20, so that different undercuts 22 result.

Also, the wax structures 21 (and hence the component structural elements 11 of the component 10) have substantially the same shape among one another. This must not necessarily be the case. In advantageous embodiments, linear and rod-shaped wax structures 21 could be combined with one another in a wax model 20. Also, the dimensions of the wax structures 21 and the density of the wax structures 21 on the wax model 20 can differ.

In this way, components 10 with very different component structural elements 11 can be efficiently manufactured. The shape and arrangement of the component structural elements 11 can here be adapted to the respective applications.

Figure 10A:
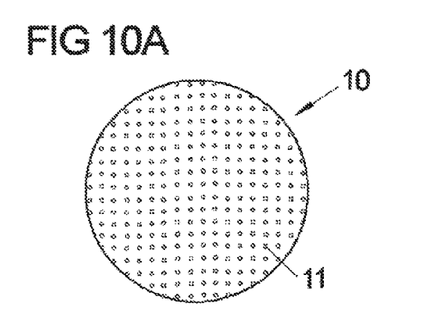
FIGS. 10A-D show detail top views onto components with component structural elements.

FIGS. 10A to 10O show various embodiments for the arrangement of component structural elements 11 on a component 10 in schematic top views.

FIG. 10A shows a regular arrangement of rod-shaped component structures 11. The individual rod-shaped component structural elements 11 are here arranged in linear form in rows and lines. There is thus a regular arrangement of component structural elements 11.

Figure 10B:
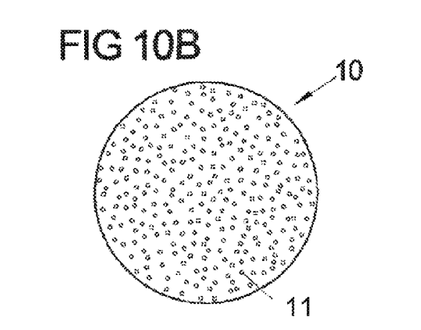

FIG. 10B also shows rod-shaped component structural elements 11, these being arranged in a random pattern.

Figure 10C:
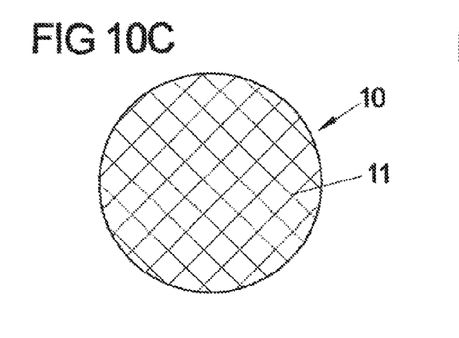

FIG. 10C shows an embodiment of a component 10 on which linear component structural elements 11 are arranged in the form of a regular lattice network.

Figure 10D:
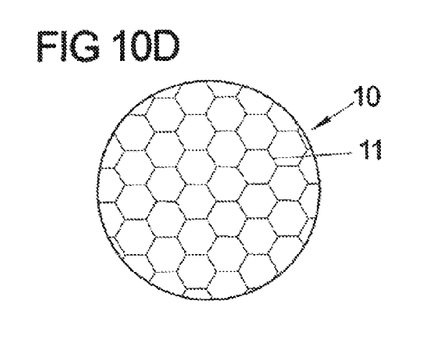

FIG. 10D by contrast shows an embodiment of a component 10 in which the component structural elements 11 have a honeycomb form.

Generally speaking, it is possible for different areas of a component 10 also to have different component structural elements 11. In one part, linear component structural elements 11 can for example be a relatively wide distance apart from one another, in another part of the component rod-shaped component structural elements 11 can be arranged very closely adjacent to one another. The type of structuring can in this way be adapted to the thermal, mechanical and physical loads acting on the component 10.

Figure 11:
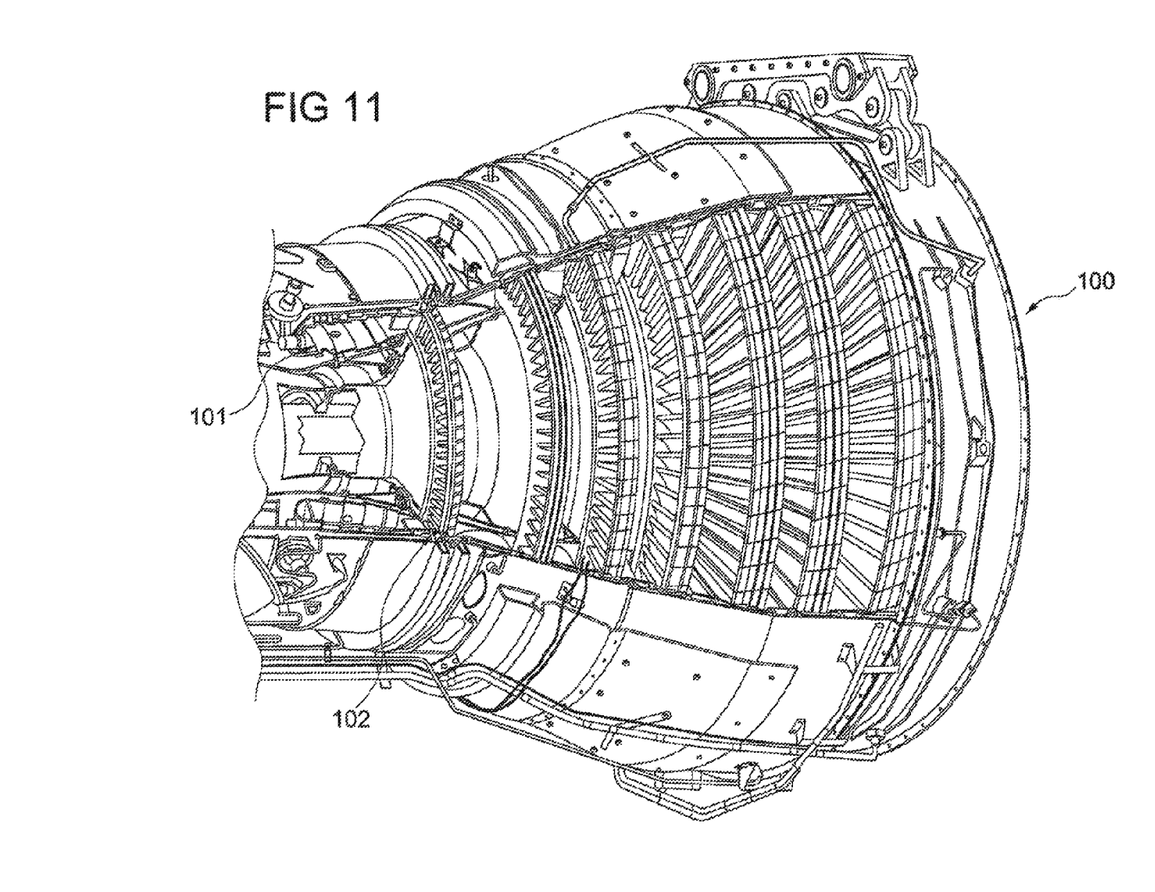
FIG. 11 shows a perspective representation of an aircraft engine indicting points where the components can be used.

FIG. 11 shows in a perspective view an aircraft engine 100 as an example for a turbomachine. The components 10, whose manufacture and properties were described above, can be used in particular in those areas of a turbomachine in which high temperature loading is present. A ceramic coating 2 is used as the thermal insulating layer. An alternatively or additionally applied fibre composite material layer 6, 7 can be used to protect layers underneath.

It is for example useful to arrange the components 10 in the area of the combustion chamber 101 or in the intake area 102 of the turbine, since particularly high temperatures (e.g. between 1100 and 2000 K) prevail here. Additionally or alternatively, the components 10 can also be used as liners in walls of the turbine, since high mechanical, thermal and physical loads are present. It is also possible to manufacture assemblies of the aircraft engine 100 themselves by precision casting in such a way that they have the properties of the component 10.

An aircraft engine 100 is only an example for the use of a component 10 of the type herein described. The components 10 can also be used in stationary gas or steam turbines.

LIST OF REFERENCE NUMERALS

2 Ceramic coating
3 Segmentation cracking
5 Contact plate

6 Permeable material, e.g. fiber mat, matrix material for fiber composite layer
7 Hardenable plastic
10 Component
10' Component prior to ceramic coating
11 Component structural elements
12 Undercut on structure of component
20 Wax model
21 Wax structure
22 Undercut on structure of wax model
23 Tip of wax structure
100 Turbomachine, aircraft engine
101 Combustion chamber
102 Intake area of turbine
A Distance between two component structural elements
H Height of component structural element
T Thermal treatment

What is claimed is:

1. A method for manufacturing a metallic component for a turbomachine, comprising:
   a) producing for a precision-casting process, a wax model with a wax structure,
   b) subsequently, thermally treating a tip of the wax structure to form a region with a model undercut on the wax structure, wherein the thermally treating includes applying heat to outward tips of the wax structure to melt the outward tips such that the outward tips deform plastically and widen to form the model undercut on the wax structure,
   c) subsequently, manufacturing the metallic component from the wax model in the precision-casting process, to form a component structural element with a component undercut on a surface of the component,
   d) coating the component structural element at least partially with a permanent ceramic coating suitable for operation in the turbomachine,
   after application of the ceramic coating, subjecting the ceramic coating to a plurality of thermal cycles which induce tensile stresses into the ceramic coating to cause controlled segmentation cracking in the ceramic coating originating from the component structural element, the controlled segmentation cracking splitting the ceramic coating into a plurality of single ceramic parts which prevent an undesirable level of mechanical stresses in the ceramic coating, the plurality of single ceramic parts remaining held securely on the component structural element;
   wherein the wax structure includes at least one chosen from rod-shaped structures, linear structures, lattice structures and honeycomb structures.

2. The method in accordance with claim 1, and further comprising thermally treating the tip of the wax structure by using at least one chosen from a laser, an IR radiation source, a flame and a contact heater.

3. The method in accordance with claim 1, and further comprising thermally treating the wax structure in a uniform or locally varying manner.

4. The method in accordance with claim 1, and further comprising thermally treating the tip of the wax structure to provide the tip with a rounded or mushroom shape to form the model undercut underneath the rounded or the mushroom-shaped tip.

5. The method in accordance with claim 1, wherein the component structural element has a mean height of between 0.2 and 2 mm.

6. The method in accordance with claim 1, and further comprising forming one or more further component structural element adjacent the component structural element, wherein there is a mean distance of between 0.2 and 4 mm between the one or more further component structural element and the component structural element.

7. The method in accordance with claim 1, and further comprising applying, prior to coating the component structural element, an intermediate layer of at least one chosen from an adhesion-promoting layer, an anti-corrosion layer and an anti-oxidation layer.

8. The method in accordance with claim 1, and further comprising using a heated contact plate to perform the thermal treating.

* * * * *